Patented Aug. 13, 1940

2,211,702

UNITED STATES PATENT OFFICE 2,211,702

5-SULPHONAMIDES OF 2-HYDROXY-PYRIDINES

Carl Naegeli, Zurich, Switzerland, assignor to Cilag, Chemisches Industrielles Laboratorium A. G., Schaffhausen, Switzerland No Drawing. Application May 31, 1939,
Serial No. 276,651

5 Claims. (Cl. 260—296)

This invention relates to compounds useful as medicines and to processes for their manufacture. It is more particularly directed to a class of compounds having bactericidal action against various forms of bacteria; and processes for their manufacture.

The object of this invention is to produce a series of compounds, having a wide range of usefulness in destroying bacteria, and which possess marked therapeutic value in the treatment of various infections of the body; and to provide a simple, easily-practised process for the production of such compounds.

The invention comprises as a new material a series of non-poisonous compounds, having a bactericidal character, obtained by introducing the sulphonamide group into 2-hydroxypyridines. The compositions comprised herein are more specifically defined hereinafter.

In accordance with the present invention, I have found that the 5-sulphonamides of 2-hydroxy- and 2-alkoxypyridines, which may be expressed by the formula:

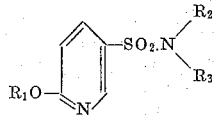

in which $R_1$, $R_2$, $R_3$ are radicals of the class consisting of hydrogen, alkyl-, alkylene-, aryl-, aralkyl-, alicyclic-, heterocyclic- and acyl-groups are relatively non-toxic, while possessing specific bactericidal action, and they must be regarded as a new and characteristic, as well as most valuable order of medical preparations, efficacious in infectious diseases, propagated by various microbes, and particularly by the cocci type.

It will be noted that the sulphonamides of α-hydroxy-pyridine are related to the 3-nitro-4-hydroxy-benzene-sulphonamide which lately has been shown to be very effective in healing mice infected with streptococci.

The members of the 2-hydroxypyridine-5-sulphonamide group can be administered either as such or in form of their salts with alkalis orally and some of them subcutaneously, intramuscularly and intravenously.

The following are preferred processes for manufacturing a few compositions in accordance with the invention:

1. 20 grammes of 2-chloropyridine-5-sulphonamide are heated for 6 hours at the reflux condenser with 150 ccm. of a 10% sodium hydroxide solution. By neutralising the clear solution the 2-hydroxy-pyridine - 5 - sulphonic-acid-amide is precipitated. It is purified by recrystallisation from hot water. M. P. 269–271° C. The substance is readily soluble in hot water, in alkali and warm alcohol.

2. 20 grammes of 2-chloropyridine-5-sulphon-allylamide are refluxed for 8 hours with 140 ccm. of a 10% sodium hydroxide solution. By acidifying the solution the 2-hydroxy-pyridine-5-sulphonic-acid-allylamide is precipitated. It is recrystallised from hot water. M. P. 159–161° C. It is easily soluble in dilute alkalis, boiling alcohol, acetone and ethyl acetate, less soluble in hot water.

3. 20 grammes of 2-chloropyridine-5-sulphon-dimethylamide are mixed with 150 ccm. of 10% sodium hydroxide and some copper-powder. The mixture is stirred and heated for 5 hours. The clear solution is acidified, the 2 - hydroxy -pyridine - 5 - sulphon-dimethylamide is collected and recrystallised from water. Platelets; M. P. 212–214° C. The substance is readily soluble in alkali, in hot water, warm alcohol and acetone; it is difficultly soluble in acids, cold water, alcohol, acetone, ether and benzene.

4. 20 grammes of 2-chloropyridine-5-sulphon-anilide are boiled for 7 hours in a solution of 140 ccm. 10% sodium hydroxide. On neutralising the 2-hydroxy-pyridine-5-sulphonic-acid-anilide crystallises and is purified by recrystallisation from water-alcohol. M. P. 210–212° C. It is easily soluble in alkali, less soluble in hot water, boiling alcohol and acetone.

5. 40 grammes of 2-chloropyridine - 5 - sulphonyl-(p-nitraniline) are refluxed for 6 hours with 400 ccm. 10% sodium hydroxide. The filtered solution is acidified, the precipitate is washed with water, dissolved in a little alkali, the solution is diluted with water, heated and acidified with dilute acid. The 2 - hydroxy -pyridine-5-sulphonyl-(p-nitraniline) crystallises from the hot solution. M. P. 282° C.

10 grammes of the nitro-compound are reduced in a 2-normal sodium carbonate-solution with 10% sodium hypo-sulphite. The solution delivers 2 - hydroxypyridine - 5 - sulphonyl - (p - amino -aniline) as a colourless substance, which is recrystallised from hot water. M. P. 245° C. The substance dissolves readily in acids, alkalis and boiling alcohol; it is only difficultly soluble in hot water, acetone, ethyl acetate, ether and benzene.

6. 20 grammes of 2-chloropyridine-5-sulphon-benzylamide are heated for 6 hours at the reflux condenser with 140 ccm. of a 10% sodium hydroxide solution. By neutralising the clear solution the 2-hydroxy-pyridine-5-sulphonic-acid-benzylamide is precipitated. It is purified by recrystallisation from hot water. M. P. 168° C. The substance is readily soluble in alkali.

7. 20 grammes of 2-chloropyridine-5-sulphonyl-cyclo-hexylamine are refluxed for 7 hours with 150 ccm. 10% sodium hydroxide, containing 0.5 grammes of copper-powder. The mixture is vigorously stirred all the time. After filtering and neutralising the hot solution the 2-hydroxy-pyridine-5-sulphonyl-cyclohexylamine is recovered and recrystallised from alcohol-water. M. P. 169-172° C. The substance is readily soluble in dilute alkalis, in hot alcohol, acetone, ethyl acetate and chloroform, less soluble in hot water.

8. 20 grammes of 2-chloropyridine-5-sulphonyl-piperidine are boiled with 100 ccm. of a solution of 10 grammes sodium hydroxide in a mixture of alcohol and water. By acidifying the solution the 2-hydroxy-pyridine-5-sulphonyl-piperidine is precipitated. It is recrystallised from hot water. M. P. 236-238° C. The substance is easily soluble in dilute alkali, in hot water, alcohol and acetone.

9. 20 grammes of 2-(2'-chloropyridine-5-sulphonyl-)aminopyridine-5-sulphonamide are hydrolysed with 10 ccm. of a 10% sodium hydroxide solution (7 hours, 100-110° C., copper-powder). The clear, red solution is acidified and the precipitated 2-(2'-hydroxypyridine-5'-sulphonyl-)aminopyridine-5-sulphonamide recrystallised from a hot ammonia solution by adding acid. The microscopically small needles melt at 295° C. (decomposition). The compound is readily soluble in cold alkalis, very little soluble in hot water and in acids as well as in organic solvents.

10. 20 grammes of N¹,N¹-dimethyl-N⁴-[N'⁴-(2''-chloropyridine-5''-sulphonyl-)sulphanilyl-]sulphanilamide are heated for 7 hours with 10 ccm. 10% sodium hydroxide. On acidifying the filtrate N¹,N¹-dimethyl-N⁴-[N'⁴-(2''-hydroxypyridine-5''-sulphonyl-)sulphanilyl-]sulphanilamide is precipitated as a colourless substance. It is recrystallised from water-alcohol and decomposes at 188° C. The new compound dissolves readily in dilute alkali, acetone, alcohol and ethyl acetate; it is only difficultly soluble in boiling water, acids, ether and benzene.

11. 20 grammes of 2-(2'-chloropyridine-5'-sulphonyl-)amino-pyridine are added to a solution of 30 grammes of sodium ethylate in 300 ccm. absolute alcohol. After heating for 1½ hours the mixture is cooled and acidified with dilute hydrochloric acid. The 2-(2'-ethoxypyridine-5'-sulphonyl-)aminopyridine is thoroughly washed with water and recrystallised from water-alcohol. The colourless crystals melt at 180° C.; they readily dissolve in dilute alkali, warm acids and are difficultly soluble in hot water, alcohol, acetone, ethyl acetate, ether and benzene.

12. 15 grammes of 2-chloropyridine-5-sulphonyl-allylamine are boiled for 2 hours with a solution of 1 gramme of sodium in butanol. The alcoholic layer is washed with dilute acid and water, the butanol is removed in vacuo and the residue treated with water. The 2-butoxy-pyridine-5-sulphonyl-allylamine is recrystallised from alcohol-water. The crystals melt at 67-68° C. The substance dissolves readily in sodium hydroxide, alcohol, acetone, ethyl acetate, ether, benzene, is less soluble in boiling petroleum ether and only difficultly soluble in hot water and dilute hydrochloric acid.

The yield of the substances described amounts to about 80-90%.

As many apparently widely different embodiments of this invention may be made without departing from the spirit thereof, it will be understood that I do not intend to limit myself to the specific embodiment herein set forth, except as indicated in the appended claims. By "aryl"-, "aralkyl"- and "heterocyclic" groups is meant any group whose ring can contain any radical, such as carboxylic, sulphonic, sulphonamide, arsenic, nitril, nitro groups, iodine, hydroxy, amino groups and the like.

With respect to substances containing hydrogen in the place of R₁ it is to be understood that although they are formulated as hydroxypyridine compounds the question regarding the tautomerism of α- and γ-hydroxy-pyridine (respectively α- and γ-pyridones) is not yet settled.

I claim:

1. A medicinal preparation including a substance non-toxic in approved dosage having the general formula

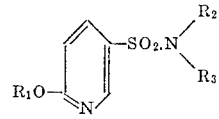

in which R₁, R₂, R₃, are radicals of the class consisting of hydrogen, alkyl-, alkylene-, aryl-, aralkyl-, alicyclic-, heterocyclic- and acyl-groups, prepared for use in the treatment of germ infections.

2. As a medicinal substance 2-hydroxy-pyridine-5-sulphonic-acid-amide of the M. P. 269-171° C., prepared for use in the treatment of germ infections.

3. As a medicinal substance 2-hydroxy-pyridine-5-sulphonic-acid-allylamide of the M. P. 159-161° C., prepared for use in the treatment of germ infections.

4. As a medicinal substance 2-(2'-ethoxypyridine-5'-sulphonyl-)aminopyridine of the M. P. 180° C., prepared for use in the treatment of germ infections.

5. A process for producing a medicinal substance for use in the treatment of germ infections, which comprises heating a 2-chloropyridine-5-sulphonamide with alkali, whereby the chlorine atom is substituted by the hydroxyl group, and purifying to remove the harmful by-products.

CARL NAEGELI.